Jan. 6, 1925.         1,521,613
I. L. FRIEDLAENDER
VEHICLE SHIPPING JACK OR BRACKET
Filed Aug. 31, 1923    2 Sheets-Sheet 1
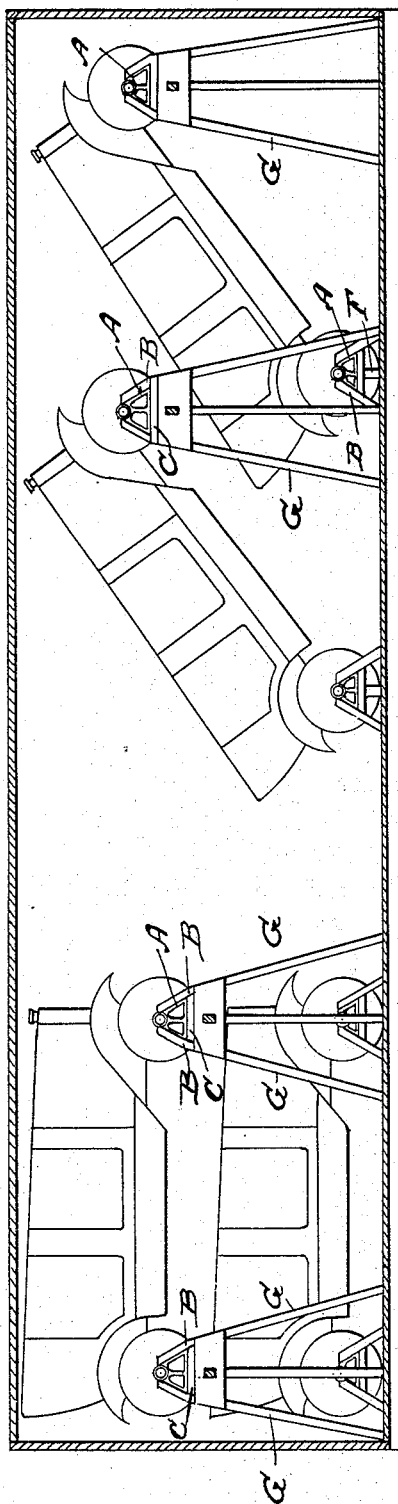
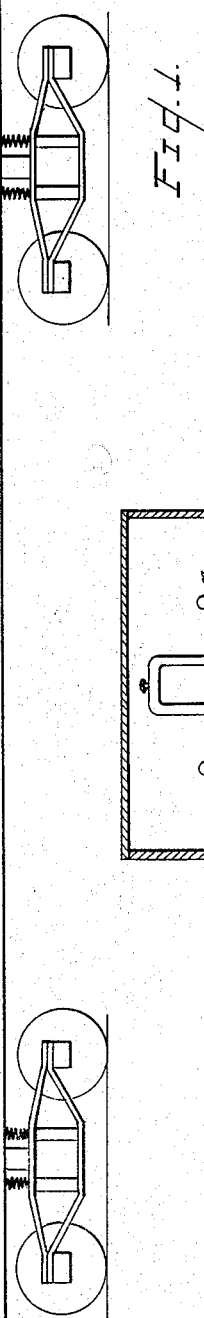
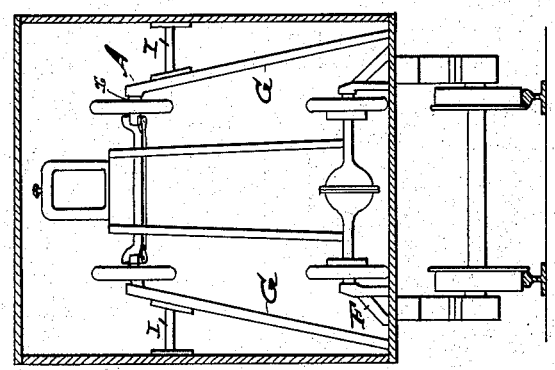
Inventor
Isador Leo Friedlaender
By J. E. Thomas
Attorney Jan. 6, 1925. 1,521,613
I. L. FRIEDLAENDER
VEHICLE SHIPPING JACK OR BRACKET
Filed Aug. 31, 1923 2 Sheets-Sheet 2
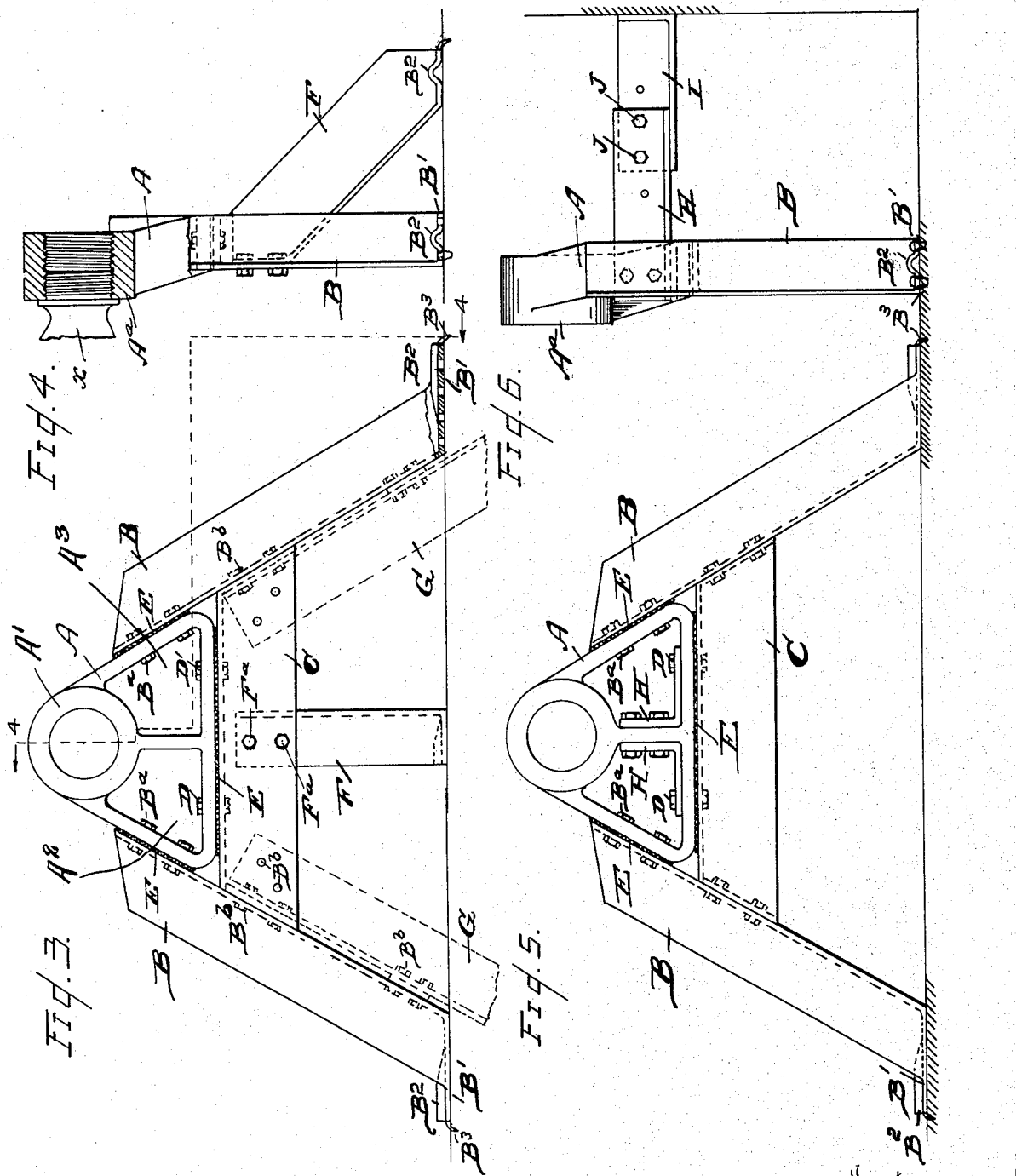

Patented Jan. 6, 1925.

1,521,613

UNITED STATES PATENT OFFICE.

ISADOR LEO FRIEDLAENDER, OF DETROIT, MICHIGAN.

VEHICLE SHIPPING JACK OR BRACKET.

Application filed August 31, 1923. Serial No. 660,431. REISSUED

*To all whom it may concern:*

Be it known that I, ISADOR LEO FRIEDLAENDER, citizen of the United States, residing at Detroit, county of Wayne, State of Michigan, have invented a certain new and useful Improvement in Vehicle Shipping Jacks or Brackets, and declare the following to be a full, clear, and exact description of the same, such as will enable others skilled in the art to which it pertains to make and use the same, reference being had to the accompanying drawings, which form a part of this specification.

My invention relates to an improvement in vehicle shipping jacks or brackets for freight cars shown in the accompanying drawings and more particularly described in the following specification and claims.

This invention consists primarily in providing a fitting adapted to be screwed upon the wheel hubs, following the removal of the hub caps, or it may be screwed directly upon the axle of the vehicle upon removing the usual castellated nut screwed upon the ends of the axles.

A further object of the invention is to so construct the fitting that it may be adapted for engagement with a suitable framing to secure the vehicle either directly upon a freight car floor, or in an inclined or in a horizontally elevated position, so as to provide for shipping a plurality of automobiles directly upon the floor of the car and in an elevated position.

While the fitting screwed to the wheel hub or directly upon the ends of the axles may be of any suitable shape, a delta formation is preferred, this shape having advantages over other forms of construction as it may be readily attached to legs or like members of suitable length for supporting the vehicles one above the other.

A further advantage of the delta-shape is that it is adapted to act as a lever when screwing the fitting on or off the wheel hub or axle.

A further advantage of this form of construction is that when attached to extension legs or frames, nailed to the floor of the freight car, the frame is not apt to be strained to a breaking point in the event of the automobile jumping upward due to shocks occasioned by the movement of the freight car.

A further advantage of this form of construction is that the bracket and legs attached thereto and which are nailed to the floor of the car act as a brake on the automobile wheels to prevent the latter from moving or the wheels from turning,—and even though the nails attaching the legs to the floor become loose the braking action will still obtain.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a diagrammatic longitudinal vertical sectional view through a freight car showing my invention applied to the support of vehicles, one above the other, either in a horizontal position, or tilted at an angle to the floor of the car.

Figure 2 is a diagrammatic cross-sectional view through the freight car shown in Figure 1, indicating the manner of bracing a tilted vehicle to the side walls of the car.

Figure 3 is an elevation of the device secured to a suitable framing or the like, nailed to the floor of a freight car, and in dotted lines fragmentary members attached thereto to elevate the car above a vehicle supported beneath.

Figure 4 is a vertical cross-sectional view taken on or about line 4—4 of Figure 3 showing the device screwed upon the hub of a vehicle wheel, after the removal of the usual hub cap.

Figure 5 shows a pair of angle irons attached to the delta fitting for securing and bracing it to the side walls of a car, as employed in Figure 2.

Figure 6 is an end elevation of the device showing a pair of adjustable angle irons bolted to the fitting as indicated in the preceding figure, for bracing the device to the side walls of the car.

Referring now to the letters of reference placed upon the drawings:

A, indicates a fitting preferably delta-shaped, tapped to provide a hub A' to receive the threaded portion of a wheel hub $x$, upon the removal of the wheel cap;—or upon the end of the vehicle axle upon remov ing the castellated nut therefrom. The said fitting is formed with openings A² and A³ below the hub A¹ whereby to facilitate handling the fitting. The delta-shaped formation of the body and the openings therein provide for such leverage as to enable the operator to readily secure the fitting by hand onto or by hand remove it from the wheel hub or axle.
B, denotes supporting members or legs bolted to the side walls of the fitting—as indicated at Bᵃ the bolts passing into the respective openings A²—A³—and to the floor of a car through a suitable foot extension B¹, integral therewith. The extension B¹ is provided with a series of apertures for the passage of nails or bolts, whereby the legs are secured to the platform or floor of a freight car, and is preferably constructed with a raised portion B², between the nail apertures that a crow-bar or like device may be readily inserted to pry the legs from the floor when it is desired to remove the device. The foot extension may also be constructed with a downwardly directed claw B³ adapted to engage the floor of the car to assist in securing it against displacement.
C, designates a cross-member bolted to the side members for connecting the latter together and to serve as a support for the delta-shaped fitting bolted thereto as indicated at D, D.
E, E, E, indicate rubber shims, or other elastic strips, between the walls of the fitting and the supporting frame,—the purpose of which is to absorb shocks due to transit which might otherwise be transmitted to the vehicle.
F, denotes a brace member, bolted as indicated at Fᵃ to the member C, and extending laterally therefrom at an angle to the floor, to which it is nailed through apertures provided in its foot piece.
It will be noted upon referring to Figure 6 that the tapped hub portion Aᵃ of the fitting projects beyond the vertical plane of the supporting legs in order that the latter will not interfere with the rim or tire of the vehicle wheel.
As shown in dotted lines in Figure 3,— extension legs G, may be bolted as at Bᵇ to the member C and also to the members, B, B, of suitable length for supporting one vehicle above another located beneath, as diagrammatically indicated in Figure 1 of the drawings. If desired legs of suitable length may be attached directly to the delta-shaped fitting. I prefer however the construction shown in Figure 3, as this form is adapted for use in the lowermost position or by attachment of auxiliary legs to a more elevated position.
Figure 6 shows the manner of bracing the device to the side walls of a car, wherein angle irons H are bolted to each side of the central vertical web of the fitting, with apertures for the passage of bolts J to engage a T-iron or other member I, bolted to the side wall of the car; the several apertures providing for any adjustment that may be required to accommodate it to the width of the car.

As diagrammatically indicated in Figures 1 and 2,—the vehicles may be mounted either in a horizontal plane, one above the other;—or they may be tilted at an angle to the floor of the car, their forward ends overlapping each other, as may be preferred.

It will be noted that the supporting legs or side members F, extend downwardly at an angle and thus brace the vehicle against lateral sway or strain.

While I have shown a delta-shaped fitting, it will be obvious that any other form may be employed in which provision is made to screw the fitting directly upon the wheel hub or axle of the vehicle. By so attaching the fitting to the vehicle it insures a rigid connection which will not loosen up through vibration or shock due to transit, and it also serves as a brake against the rotation of the wheels of the vehicle, thereby preventing damage to the tires, for even though the nails which secure the legs to the floor become loose the wheels cannot rotate. In the event of the tires deflating in transit, they will not become "rim cut" as the supporting jack will sustain the load of the car. As previously indicated, among other advantages the delta-shape formation of the fitting eliminates the necessity of employing a wrench to screw the fitting on or off the vehicle hub or axle.

Having thus described my invention what I claim is:

1. In a device of the character described, a delta-shaped fitting provided with a plurality of openings therethrough and with a hub screw-tapped to receive a screw threaded part of a vehicle, and means bolted through the outer sides of said openings of said fitting adapted to be secured to a support whereby to support the vehicle.

2. In a device of the character described, a delta-shaped fitting provided with a plurality of openings therethrough and with a hub screw-tapped to receive a screw-threaded part of a vehicle, downwardly diverging legs having their upper ends disposed against said fitting and bolts passed through the upper ends of the legs and through the adjacent sides of the fitting and into the respective openings of the latter whereby to secure the legs and fitting together.

3. In a device of the character described, a delta-shaped fitting provided with a plurality of openings therethrough and with a hub screw-tapped to receive a screw-threaded part of a vehicle, downwardly diverging legs having their upper ends disposed against said fitting, bolts passed through the upper ends of the legs and through the adjacent sides of the fitting and into the respective openings of the latter whereby to secure the legs and fitting together, and a cross piece lying immediately beneath the under side of said fitting and secured thereto and connecting and secured to said legs.

4. In a device of the character described, a delta-shaped fitting provided with a plurality of openings therethrough and with a hub screw-tapped to receive a screw-threaded part of a vehicle, downwardly diverging legs having their upper ends disposed against said fitting, bolts passed through the upper ends of the legs and through the adjacent sides of the fitting and into the respective openings of the latter whereby to secure the legs and fitting together, and a cross piece lying immediately beneath the under side of said fitting and secured thereto and connecting and secured to said legs, and a brace secured to said cross piece to cooperate with the legs to form a tripod.

5. In a device of the character described, a delta-fitting embodying a plurality of openings and also provided with a hub above the openings to receive a part of the vehicle, and legs and brace elements secured to the fitting to support the fitting, said hub being offset slightly with relation to the longitudinal axes of the legs.

6. In a device of the character described, a delta-shaped fitting provided with a projecting hub tapped to receive a screw-threaded part of a vehicle, a suitable A-shaped framework bolted to the angular walls of the fitting, elastic shims located between the framework and the angular walls of the fitting, and a brace member bolted to the horizontal member of the A-shaped frame adapted to co-operate with the legs of the A-shaped frame in forming a tripod.

In testimony whereof, I sign this specification in the presence of two witnesses.

ISADOR LEO FRIEDLAENDER.

Witnesses:
L. E. THOMAS,
S. J. MARX.